US009717980B2

(12) United States Patent
Pearce

(10) Patent No.: US 9,717,980 B2
(45) Date of Patent: Aug. 1, 2017

(54) OPTICAL SYSTEM FOR A ROULETTE WHEEL

(71) Applicant: Active Silicon Limited, Buckinghamshire (GB)

(72) Inventor: Henry Colin Pearce, Richmond (GB)

(73) Assignee: Active Silicon Limited, Iver (GB)

( * ) Notice: Subject to any disclaimer, the term of this patent is extended or adjusted under 35 U.S.C. 154(b) by 342 days.

(21) Appl. No.: 14/356,546

(22) PCT Filed: Nov. 1, 2012

(86) PCT No.: PCT/GB2012/000822
§ 371 (c)(1),
(2) Date: May 6, 2014

(87) PCT Pub. No.: WO2013/068712
PCT Pub. Date: May 16, 2013

(65) Prior Publication Data

US 2014/0309008 A1 Oct. 16, 2014

(30) Foreign Application Priority Data

Nov. 8, 2011 (GB) .................................. 1119276.2

(51) Int. Cl.
*A63F 13/00* (2014.01)
*A63F 5/04* (2006.01)
(Continued)

(52) U.S. Cl.
CPC .................. *A63F 5/04* (2013.01); *A63F 5/00* (2013.01); *G07F 17/32* (2013.01); *A63F 2009/2419* (2013.01)

(58) Field of Classification Search
None
See application file for complete search history.

(56) References Cited

U.S. PATENT DOCUMENTS 4,396,193 A * 8/1983 Reinhardt ................. A63F 5/00 273/142 B
5,801,766 A 9/1998 Alden
(Continued)

FOREIGN PATENT DOCUMENTS

EP 1 710 000 A1 10/2006
EP 2 065 079 A1 6/2009
(Continued)

OTHER PUBLICATIONS

PCT International Search Report and Written Opinion of the International Search Authority for International Application No. PCT/GB2012/000822, dated Feb. 7, 2013, 11 pgs.
(Continued)

*Primary Examiner* — Jason Yen
(74) *Attorney, Agent, or Firm* — Brinks Gilson & Lione

(57) ABSTRACT

In a first aspect, there is described an optical system for monitoring a ball play volume of a roulette wheel. The optical system comprises an electronic image detector and a reflector arranged to reflect light from a ball play volume of a roulette wheel onto the electronic image detector. The electronic image detector is configured to form an image of the ball play volume from the reflected light. In a second aspect, there is described a method of monitoring a ball play volume of a roulette wheel. The method comprises the steps of using a reflector to reflect light from the ball play volume, and forming an image of the ball play volume from the reflected light. In a third aspect, there is described a method of manufacturing an optical system for monitoring a ball play volume of a roulette wheel. The method comprises the steps of providing an electronic image detector, and providing a reflector arranged to reflect light from a ball play volume of a roulette wheel onto the electronic image detector.

11 Claims, 2 Drawing Sheets

(51) Int. Cl.
*A63F 5/00* (2006.01)
*G07F 17/32* (2006.01)
*A63F 9/24* (2006.01)

(56) References Cited

U.S. PATENT DOCUMENTS

| | | | | | |
|---|---|---|---|---|---|
| 5,836,583 | A * | 11/1998 | Towers | A63F 5/00 273/142 B |
| 2003/0060263 | A1* | 3/2003 | Pearce | A63F 5/00 463/17 |
| 2003/0071891 | A1 | 4/2003 | Geng | |
| 2003/0198050 | A1* | 10/2003 | Yamazaki | H04N 9/3152 362/268 |
| 2008/0123205 | A1* | 5/2008 | Nakano | G02B 17/0626 359/859 |
| 2008/0214264 | A1* | 9/2008 | Griswold | A63F 5/00 463/17 |
| 2009/0124383 | A1* | 5/2009 | Gadda | G07F 17/322 463/36 |
| 2009/0174141 | A1* | 7/2009 | Witty | A63F 5/00 273/142 E |
| 2011/0244939 | A1* | 10/2011 | Cammegh | A63F 5/00 463/17 |

FOREIGN PATENT DOCUMENTS

| | | | |
|---|---|---|---|
| GB | 2 084 830 | A | 4/1982 |
| GB | 2 423 156 | A | 8/2006 |
| SI | 22441 | A | 1/2007 |
| WO | WO 95/11067 | | 4/1995 |
| WO | WO 95/28996 | | 11/1995 |
| WO | WO 99/60353 | | 11/1999 |
| WO | WO 00/74803 | A1 | 12/2000 |
| WO | WO 01/52957 | A1 | 7/2001 |
| WO | WO 01/55988 | A1 | 8/2001 |
| WO | WO 2005/106543 | A1 | 11/2005 |

OTHER PUBLICATIONS

Search Report for GB1119276.2, dated Mar. 2012, 4 pages.

Patent Examination Report No. 2, AU Patent Application No. 2012335366, dated Sep. 15, 2016, 4 pages.

* cited by examiner

OPTICAL SYSTEM FOR A ROULETTE WHEEL

FIELD OF THE INVENTION

The present invention relates to an optical system for a roulette wheel. In particular, the invention relates to an optical system for monitoring a ball play volume of a roulette wheel, and a method of using and a method of manufacturing such an optical system.

BACKGROUND TO THE INVENTION

Casino operators need to monitor roulette games for a variety of reasons. For example, automatically displaying the winning number of a roulette game together with a recent history of winning numbers is useful for the players and croupier. The results of a live roulette game linked to remote electronic gaming machines must also be communicated to the remote machines so that the remote machines may be informed of the winning numbers. Security (e.g. fraud detection) is also of increased importance to casino managers, and monitoring any suspicious activity in and around a roulette wheel is desirable. Furthermore, it is desirable for casino operators to monitor the randomness of the winning numbers, as well analyse general statistical data gathered during roulette games, such as a history of winning numbers, number of games per hour, etc. This information can allow the operators to maximise revenue, ensure fraud prevention (e.g. by monitoring the players around the roulette wheel), and increase the efficiency with which the games are run.

Current systems for monitoring roulette games may use cameras mounted on the edge of the wheel (see, for instance, WO 95/28996 and WO 01/52957) to detect the winning number by analysing a small section of the wheel at a time. A drawback of this system is that at least two revolutions of the wheel are required to confirm that the ball has come to rest in a pocket. In alternative monitoring systems, such as the ones disclosed in WO 95/11067, GB 2084830 A and EP 1710000 A1, video cameras are mounted externally to the wheel. These systems can cause problems for monitoring the wheel in that any movement or changing of the wheel will disrupt the monitoring.

The present invention seeks to overcome these and other disadvantages of the prior art.

SUMMARY OF THE INVENTION

A typical roulette wheel comprises a circular rim which, when the roulette wheel is placed flat on a playing surface, rises above the rest of the playing area. Beneath the rim is the ball track, which runs in a groove around the entire circumference of the roulette wheel. The rim may be understood as comprising the ball track. The ball track merges into a downwardly sloping surface towards the number ring. Interspersed between the number ring and the ball track are diamond-shaped protuberances, sometimes referred to in the art as “canoes”. The number ring is an annular-shaped structure of evenly-spaced numbered regions, adjacent to which are found the ball pockets. Each pocket is associated with a corresponding number and colour. The number ring and pockets form part of the cylinder, and the cylinder comprises an upstanding spindle-like structure, known as the turret.

In accordance with a first aspect of the present invention, there is provided an optical system for monitoring a ball play volume of a roulette wheel. The optical system comprises an electronic image detector and a reflector arranged to reflect light from a ball play volume of a roulette wheel onto the electronic image detector. The electronic image detector is configured to form an image of the ball play volume from the reflected light. The ball play volume is typically defined by the volume contained between the plane defined by the rim of the wheel and the top playing surface of the wheel. The ball play volume may comprise a greater volume or a lesser volume. For example, the ball play volume may encompass a portion of the volume external to the roulette wheel, such that a view of some or all of the players is reflected by the reflector and onto the electronic image detector. The reflector may be arranged to reflect part of or only a portion of the light from a ball play volume of a roulette wheel, or may be arranged to reflect substantially all of the light from a ball play volume of a roulette wheel.

Using a reflector to obtain a full 360-degree view of the ball play volume, it is possible to install an electronic image detector, such as a video camera, within the roulette wheel and thereby avoid the need to monitor the roulette wheel externally (e.g. using ceiling-mounted cameras). The optical system being used is preferably small and compact, and, because it may be housed within the roulette wheel itself, any disturbance to the wheel will have a reduced effect on the monitoring.

The optical system may further comprise an image processor. The image processor may be implemented in software, and thus may be stored on a computer-readable medium, for example. The image processor may be configured to generate video image data from the formed image. The image processor may be further configured to sample different data portions of the generated video image data, each sampled data portion corresponding to a respective image portion of the formed image, and each image portion being associated with a corresponding region of the ball play volume.

Thus, various parts of the ball play volume may be rendered in video format and analysed by the processor. Image data linked to the entire ball play volume may be gathered from a single image of the ball play volume. Thus, image processing of the formed image may be easier to carry out.

The image processor may be further configured to determine an angular velocity and/or a deceleration of a ball within the ball play volume by comparing a first data portion of the video image data sampled at different times, the first data portion corresponding to a respective first image portion associated with a corresponding region of the ball play volume in which the ball track of the roulette wheel is located. The image processor may be still further configured to determine a no more bets point by determining when a speed of the ball drops below a predetermined threshold. The no more bets point is generally the point just prior to when the ball falls away from the ball track and towards the pockets, but may be defined by particular game rules. The image processor may be further configured to signal this condition a pre-set time in advance.

The particular sector or zone of the wheel in which the ball, as it slows down, ceases to be in contact with or within the ball track may be determined from analysis of the image data. Thus, the image processor may be even further configured to determine a drop zone of the ball by determining an angular position of the ball with respect to the cylinder of the roulette wheel, when during its deceleration the ball leaves the ball track of the roulette wheel.

Thus, with single image of the ball play volume, one may determine the direction of travel of a ball around the ball track of the roulette wheel, its speed, deceleration, no more bets point, and the ball's drop zone. Other information based on the ball's speed may be gathered, such as the number of revolutions per minute and revolutions per game.

The image processor may be further configured to determine an angular velocity and/or a deceleration of the cylinder of the roulette wheel by comparing a second data portion of the video image data sampled at different times, the second data portion corresponding to a respective second image portion associated with a corresponding region of the ball play volume in which at least a portion of the number ring of the roulette wheel or at least a portion the ball pockets of the roulette wheel are located. The image processor may be further configured to determine a ball pocket of the roulette wheel in which a ball is resting by comparing a third data portion of the video image data sampled at different times, the third data portion corresponding to a respective third image portion associated with a corresponding region of the ball play volume in which the ball pockets of the roulette wheel are located.

This allows the optical system to determine, for example, the winning number. Because a full 360-degree view of the ball play volume may be obtained in a single image, the winning number may be determined much more rapidly than in the prior art, without the need to wait for multiple revolutions of the number ring to be completed.

The image processor may be further configured to determine when an object enters or leaves the ball play volume by comparing data portions of the video image data sampled at different times. Security and fraud prevention during a game of roulette is thereby increased. The image processor may be furthermore configured to detect non-solid objects entering or leaving the ball play volume. For example, it has been known to shine laser light on a ball spinning in the ball track, thereby inferring its angular velocity and deceleration. This in turn allows one to calculate the approximate drop zone of the ball before the no more bets point, giving an unfair advantage. An image processor configured to detect such laser light helps prevent this kind of fraud.

The reflector may be a mirror. The mirror may be convex such that a central portion of the mirror extends towards the electronic image detector. The mirror may also be aspherical. An aspherical mirror may be shaped such that a particular area of the ball play volume (e.g. the ball track or the numbered pockets) is given weighting such that the image of this particular area formed by the detector is more prominent and appears larger than the image portions of other areas of the ball play volume. Alternatively, the reflector may be a prism. For example, the prism may use total internal reflection to deviate light from the ball play volume onto the image detector.

The ball play volume may comprise the volume bounded between the plane formed by the rim of the roulette wheel and the remaining top surface of the roulette wheel. The ball play volume may furthermore include the topmost surface of the rim of the roulette wheel. Thus, the reflector may reflect onto the electronic image detector the maximum amount of light coming from all parts of the roulette wheel.

The optical system may comprise one or more infra-red (IR) light emitters directed towards the ball play volume. The reflector may be further arranged to reflect the emitted infra-red light onto the electronic image detector. The electronic image detector may be further configured to form the image of the ball play volume from the reflected infra-red light. Thus, under poor lighting conditions, a full image of the ball play volume may nonetheless be formed, so that monitoring of the ball play volume may go ahead. Of course, additional visible lighting could also be used, but infra-red is invisible to the human eye and so has the benefit that there is no apparent change in the lighting environment.

The formed image may include an image of the following components of the roulette wheel: the rim, the ball track, the ball pockets, and the number ring. The reflector may be shaped such that the image of one or more of the ball track, the ball pockets, and the number ring, is optimised. Thus, the image processor may determine and measure as many relevant events occurring during the game of roulette. Optimising the image of the most important components of the roulette wheel ensures that the image processor is able to more accurately carry out its analysis during and after the game.

At least one of the reflector and the electronic image detector may be positioned above the plane formed by the rim of the roulette wheel. At least one of the electronic image detector and the reflector may be located on the rotational axis of the roulette wheel. The reflector may be positioned above the electronic image detector such that light from the ball play volume is reflected off the reflector and down onto the electronic image detector. The electronic image detector may further face upwards towards the reflector. At least one of the electronic image detector and the reflector may be housed within the cylinder of the roulette wheel. This allows for economy of space and is ideal for when the optical system is conveniently housed within or on the turret of the roulette wheel. It may be possible to design the optical system such that the image detector is housed within the turret of the wheel whilst the reflector is suspended (e.g. from the ceiling) above the image detector, and is not comprised within the wheel. Furthermore, when both the reflector and detector are housed within the cylinder, the invention reduces the need for installation and calibration problems because the optical system may be built into the roulette wheel itself. Thus, not only may the optical system be discrete but it may also be self-contained—if the wheel is moved slightly or moved from one table to another, there is no need to recalibrate the wheel. All the calibration may be advantageously carried out at the factory during manufacture of the wheel. The optical system is therefore more reliable and stable.

The reflector may be housed within the cylinder and may be fixed to the cylinder via an optically transparent moulding (e.g. acrylic or ground glass). The transparent moulding may comprise a protective layer fixed to a surface of the reflector such that light from the ball play volume passes through the protective layer before being reflected off the reflector. This helps prevent the reflector getting dirty and ensures an undisturbed reflection of light from the ball play volume.

The electronic image detector may be arranged to rotate with the cylinder of the roulette wheel. The image of the number ring and pockets is therefore static and does not suffer from motion blur. This may allow lower-cost detectors to be used.

In a second aspect of the present invention, there is provided a method of monitoring a ball play volume of a roulette wheel. The method comprises the steps of using a reflector to reflect light from the ball play volume, and forming an image of the ball play volume from the reflected light.

The method may further comprise the step of using an image processor to generate video image data from the formed image. The method may still further comprise the step of sampling different data portions of the generated video image data, each sampled data portion corresponding to a respective image portion of the formed image, and each image portion being associated with a corresponding region of the ball play volume. The method may yet further comprise the step of comparing a first data portion of the video image data sampled at different times, the first data portion corresponding to a respective first image portion associated with a corresponding region of the ball play volume in which the ball track of the roulette wheel is located, so as to determine an angular velocity and/or a deceleration of a ball within the ball play volume. The method may yet again further comprise the step of determining when a speed of the ball drops below a predetermined threshold so as to determine a no more bets point. Again, the particular sector or zone of the wheel in which the ball, as it slows down, ceases to be in contact with or within the ball track may be determined from analysis of the image data. Thus, the method may further comprise determining a drop zone by determining an angular position of the ball with respect to the rotational axis of the roulette wheel, wherein the angular position is the angular position of the ball at the point where the ball, during its deceleration, leaves the ball track of the roulette wheel.

The method may further comprise the step of comparing a second data portion of the video image data sampled at different times, the second data portion corresponding to a respective second image portion associated with a corresponding region of the ball play volume in which at least a portion of the number ring of the roulette wheel or at least a portion the ball pockets of the roulette wheel are located, so as to determine an angular velocity and/or a deceleration of a ball within the ball play volume.

The method may further comprise the step of comparing a third data portion of the video image data sampled at different times, the third data portion corresponding to a respective third image portion associated with a corresponding region of the ball play volume in which the ball pockets of the roulette wheel are located, so as to determine a ball pocket of the roulette wheel in which a ball is resting.

The method may further comprise the step of comparing data portions of the video image data sampled at different times, so as to determine when an object enters or leaves the ball play volume.

In a third aspect of the present invention, there is provided a method of manufacturing an optical system for monitoring a ball play volume of a roulette wheel. The method comprises the steps of providing an electronic image detector, and providing a reflector arranged to reflect light from a ball play volume of a roulette wheel onto the electronic image detector. Thus, existing roulette wheels may be retrofitted with the optical system of the present invention. For example, a roulette wheel turret may be dismantled and a reflector and an electronic image detector according to the present invention may be incorporated within the turret, thus arriving at an improved roulette wheel.

BRIEF DESCRIPTION OF THE DRAWINGS

The present invention may be put into practice in a number of ways and an embodiment will now be described by means of an example only, and with reference to the accompanying drawings in which.

DETAILED DESCRIPTION OF A PREFERRED EMBODIMENT

Figure 1:
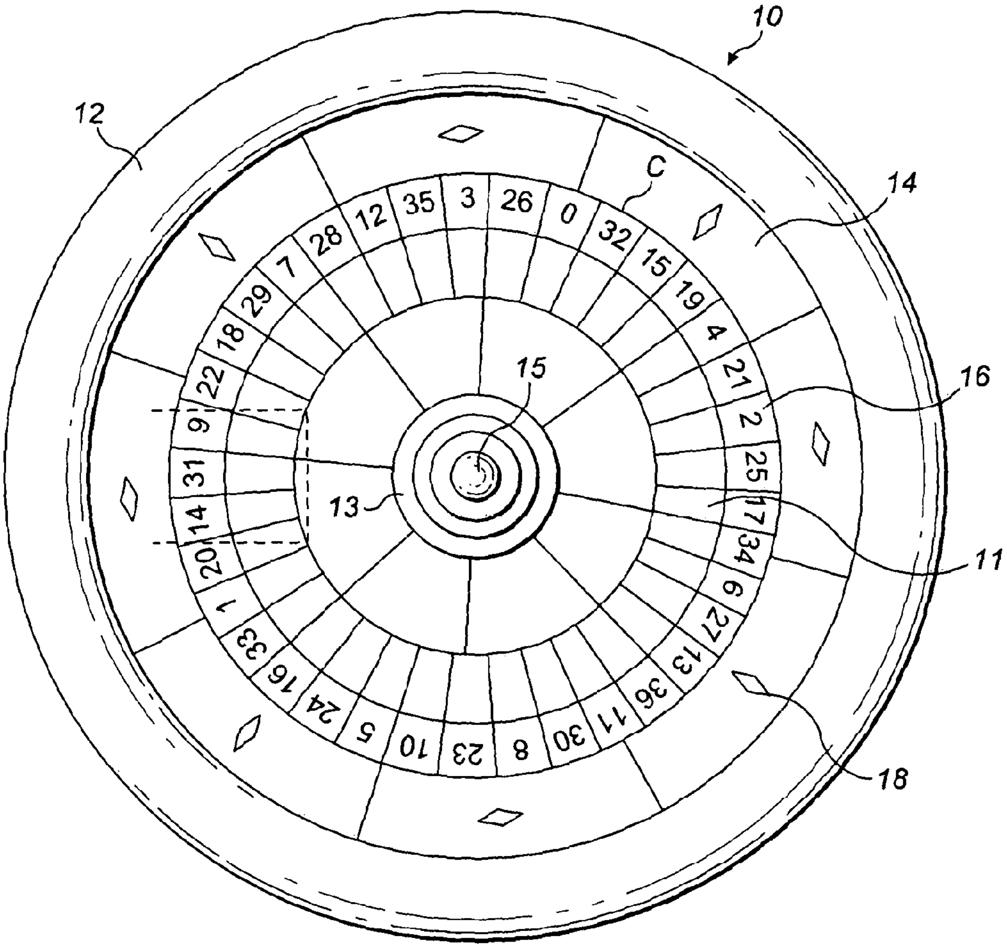
FIG. 1 is a plan view of a roulette wheel that may be used with the present invention.

With reference to FIG. 1, there is shown a typical roulette wheel 10 as used all over the world. The roulette wheel comprises a circular rim 12 which, when the roulette wheel 10 is placed flat on a playing surface, rises above the rest of the playing area. Beneath the rim 12 is the ball track (not shown), which runs in a groove around the entire circumference of the roulette wheel 10. The ball track merges into a downwardly sloping surface 14 towards the number ring 16. Interspersed between the number ring 16 and the ball track are eight diamond-shaped protuberances 18, sometimes referred to in the art as “canoes”.

The number ring 16 is an annular-shaped structure of evenly-spaced numbered regions, adjacent to which are found the ball pockets 11. Each pocket 11 is associated with a corresponding number and colour. The number ring 16 and pockets 11 form part of the cylinder 13, and the cylinder 13 comprises an upstanding spindle-like structure 15, known as the turret.

When a game of roulette is played, the croupier spins the cylinder 13 which is arranged to rotate independently of the remainder of the wheel (e.g. the rim 12, ball track and sloping section 14), thereby inducing a corresponding rotation the number ring 16 and pockets 11. Circumferential line C denotes the extent of the cylinder 13. A ball is then spun (generally in the opposite direction to the rotating cylinder) around the ball track. During this time, players may place their bets. As the ball gradually loses momentum, it drifts away from the ball track, down the sloping section 14 and towards the canoes 18. Before the ball begins to drift too far from the ball track, the croupier indicates that no more bets may be placed. Eventually, the ball ricochets off a canoe 18 or else otherwise tumbles towards the ball pockets 11. The ball will come to rest in one of the numbered and coloured pockets 11, signifying the winning number/colour.

Many individual games of roulette may be played by any number of participants in a given time period, and this results in a large accumulation of winning numbers and colours. Casino operators seek to rapidly, efficiently and automatically determine the winning combinations, as well as carry out measurements and analysis on the moving components of the wheel (e.g. the cylinder, the ball, etc.) during a game.

Figure 2:
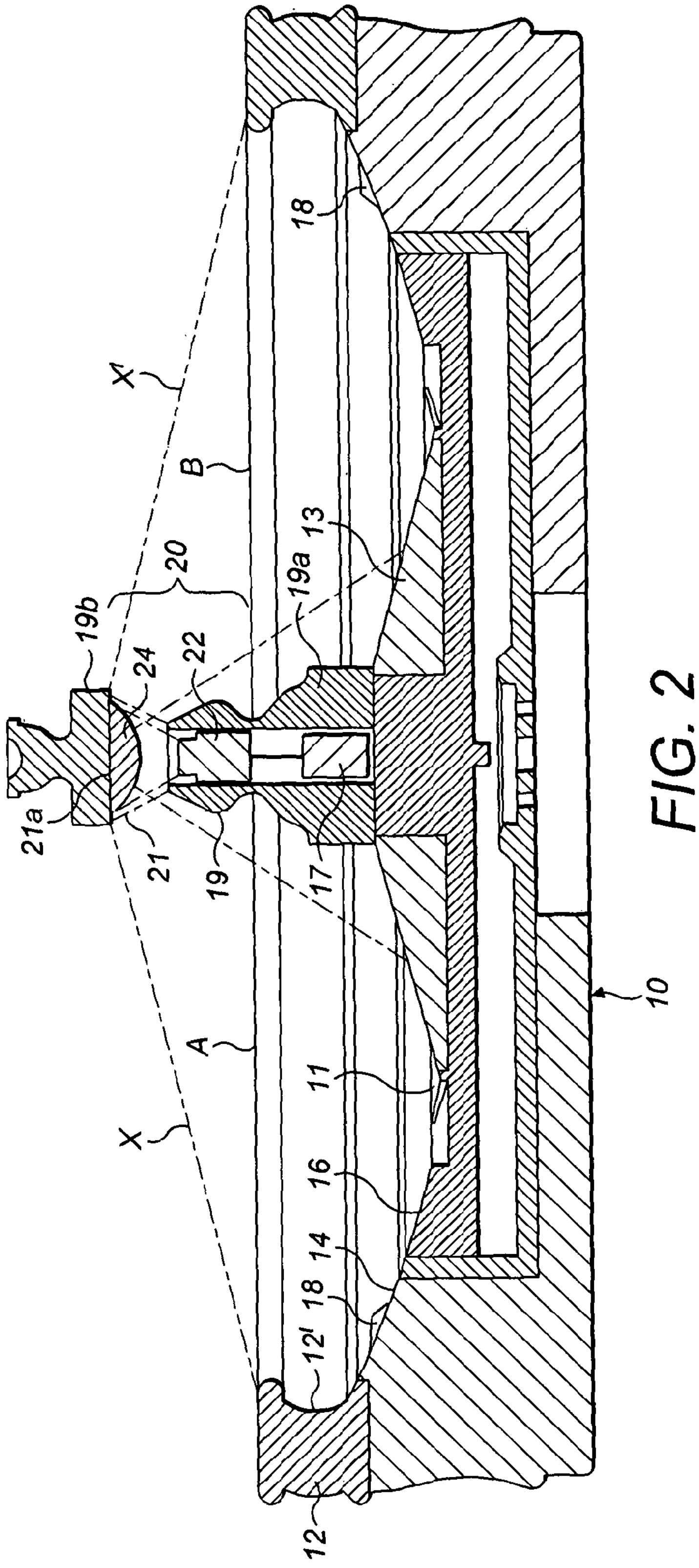
FIG. 2 is a cross-sectional view of a roulette wheel comprising an optical system according to a preferred embodiment of the present invention.

In accordance with a preferred embodiment of the present invention, and as shown in FIG. 2, there is provided an optical system 20 for monitoring a ball play volume of a roulette wheel 10. The roulette wheel 10 may be any typical roulette wheel used around the world, and in the present embodiment may be roulette wheel 10 illustrated in FIG. 1. The roulette wheel 10 comprises a turret 19 (otherwise known as a spindle) subdivided into a turret lower portion **19*a* and turret upper portion 19*b*. The two turret portions 19*a*, 19*b* are connected via a glass tube 21** having a generally frustoconical shape. Alternatively, the glass tube may instead be formed of a plastics moulding, such as a Perspex tube.

The optical system comprises a video camera 22 and a convex, aspherical reflector, or mirror 24 arranged within the cylinder 13 of the roulette wheel 10. The camera 22 is positioned such that it faces vertically upwards, away from the roulette wheel 10. The camera 22 is housed within a hollowed central channel of the turret lower portion **19*a* such that, when the topmost edge of the turret lower portion 19*a* is viewed at eye level, the camera 22 does not protrude from turret lower portion 19*a*. The camera 22 is therefore vertically fixed within the turret lower portion 19***a*. In an alternative embodiment, the camera 22 may be arranged to rotate with the turret 19 when the cylinder 13 is spun by the croupier.

Various types of video cameras may be used in the present invention. Standard interlaced video cameras operating at 60 fields per second (60 Hz) may be used. These equate to 30 full-frames per second. Due to the motion analysis that is performed by the image processor (see later), the analysis of fields is preferable, at the expense of vertical resolution. More expensive cameras with higher resolution, greater low-light sensitivity and progressive scan (non-interlaced) output may be used. These have the benefit that the image processing would be slightly simpler since a higher quality image would be obtained. The video camera may be a camera from the CMOS 20/21B45 series, or a ¼" CCD High Resolution Color Board Camera, both manufactured by Videology Imaging Solutions, Inc. Alternatively, the video camera may be a Sony Machine Vision Camera from its XCG Series.

In the present embodiment, the video camera 22 is adapted to detect light in the visible range, and the roulette wheel 10 is adequately illuminated in order to facilitate the image processing algorithms. Visible light LEDs may be mounted within the wheel 10 to illuminate the wheel 10 and provide a more stable lighting environment for the video camera or detector 22 to work in. It may be preferable in some circumstances to use infra-red light and a camera adapted to detect wavelengths in the infra-red spectrum. A plurality of IR LEDs may be built into the wheel 10 and the invention would thereby function well in low visible-light conditions. This would advantageously allow for the use of lower-cost, less sensitive cameras.

Upper surface 21*a* of the glass tube 21 is ground, moulded or otherwise formed into a concave shape. A highly reflective coating is then applied to the domed-out upper surface of the glass tube 21, thus forming convex mirror 24. Turret upper portion 19*b* is positioned above the glass tube 21. In an alternative embodiment, the mirror 24 may be independent of the glass tube 21, and fine supports may be used to fix the mirror 24 to the turret upper portion 19*b*.

The mirror 24 is arranged to reflect light from the ball play volume of the roulette wheel onto the video camera. As can be seen from lines X and X', the mirror 24 is adapted to divert light originating from substantially the entire playing surface of the roulette wheel, including the rim 12, the ball track 12', the sloping surface 14, the canoes 18, the number ring 16, the ball pockets 11, and parts of the turret 19. Light from these various components of the roulette wheel 10 thus passes through the glass tube 21 and is reflected off the mirror 24 onto the video camera 22. The video camera 22 is therefore able to form an entire image of the ball play volume.

The ball play volume is defined by the volume contained between the plane defined by the rim 12 of the wheel 10 (line A-B) and the top playing surface of the wheel 10. In other embodiments, the ball play volume may comprise a greater volume or lesser volume. For example, the mirror 24 could be shaped such that the ball play volume encompasses a portion of the volume external to the roulette wheel, such that a view of some or all of the players are reflected by the mirror 24 and onto the camera 22. The field of view may be greater than the ball play volume.

The video camera 22 is in communication with an image processor 17. The electrical connection from the camera 22 to the processor 17 runs down through the central hollowed section of the turret 19. In the case where the camera 22 is arranged to rotate with the cylinder 13 when it is spun by the croupier, a slip-ring may be used to maintain a constant electrical connection between the camera 22 and the processor 17. Whilst FIG. 2 depicts the image processor 17 within the turret 19, it should be understood that the image processor 17 may be disposed in any other suitable location within the roulette wheel 10, or indeed may be remote from the wheel 10 (and could wirelessly communicate with the camera 22, for example).

The image processor 17 is configured to gather data from the image of the ball play volume that is formed by the camera 22. Various data manipulation techniques and algorithms may then be employed to determine events occurring within the ball play volume, and otherwise to monitor the games of roulette taking place.

In use, the optical system 20 functions as follows. A croupier begins by spinning the cylinder 13 of the roulette wheel 10, and then sets the ball spinning in the ball track 12'. Because of the convex nature of the mirror 24, and because of its position within the turret 19, a full 360-degree view of the ball play volume may be obtained and reflected onto the video camera 22. Thus, the camera 22 forms a single image representative of a full view of the ball play volume. The image processor 17, communicating with the camera 22, generates video image data from the image formed by the camera 22. Based on the video image data, a variety of measurements may be taken and recorded.

The image processing algorithms and techniques used by the present invention are disclosed in WO 99/60353 and WO 01/55988. Other techniques and algorithms may be used. The image processor 17 samples portions of the gathered video data. These portions correspond to an array of points in specified areas of the image formed by the camera 22. Each area corresponds in turn to particular regions of the ball play volume. In other words, the portions of video data that are sampled are representative of corresponding regions of the ball play volume that encompass certain components of the wheel 10. For example, data corresponding to an area of the image illustrating the ball track 12' may be analysed to determine an angular velocity of a ball within the ball track 12'.

By processing the image data in this fashion, a variety of statistical information can be gathered on the roulette games taking place. These include, but are not limited to, the following:

Ball launch position and game start: By analysing portions of the video image data corresponding to a region of the ball play volume where the ball track 12' is located, it is possible to determine at what angular position along the ball track 12' the ball is launched. The position of a large object in the frames, such as the croupier's hand, indicates the launch position of the ball. The optical system 20 typically includes a real-time clock so that the start and end times of a game can be recorded for statistical and management purposes.

Ball launch speed: By noting the position of the ball as it starts spinning in the rim 12 (e.g. in the ball track 12') over sequential images, and by knowing the temporal sampling rate of the camera 22, the revolutions per minute of the ball can be determined.

Ball direction: Ball direction is useful statistical information as many casinos require that the ball direction alternates between games, whilst others require that it remain constant. The ball direction may be detected, checked and recorded.

Ball deceleration: This may be measured using sequential measurements of the ball's speed over a certain time period. Irregular changes in a ball's deceleration over many games may be indicative of a misaligned wheel, or an improperly functioning wheel.

Number of ball revolutions before winning number: This is useful statistical information.

No more bets point: This is the point in time when no further bets are allowed (different casinos/tables may typically operate on different timing depending on the circumstances, such as the number of players). This may be determined by monitoring in real-time the speed of the ball. At a certain speed, the ball will fall away from the ball track and towards the number ring 16 and pockets 11. This threshold may be programmed to set a certain no more bets point. The event may be linked to casino surveillance systems to record at this point close-up activity of players betting late or to signal to players the no more bets point.

Speed and direction of cylinder: The speed and direction of the cylinder 13 as spun by the croupier at the start of the game may be detected by noting the position of zero pocket (or indeed any numbered pocket 11) in each sequential frame.

Winning number: The pocket 11 into which the ball comes to rest may be determined. This may be achieved by analysing a portion of the video image data corresponding to a region of the ball play volume in which the number ring 16 lies. A subsequent sampling of a portion of video data corresponding to a region of the ball play volume in which the ball pockets 11 are located may then confirm the presence of a ball in a certain pocket 11, which may be associated with its corresponding number and pocket. The system may be linked to a display such that the winning number, once determined, is displayed for all players to easily see.

Security: If during a game any foreign objects (such as a player's hand) enter the ball play volume, these events may be detected, recorded and acted upon.

The invention claimed is:

1. An optical system for monitoring a ball play volume of a roulette wheel, comprising:

an electronic image detector;

a convex reflector arranged to receive light from a ball play volume of a roulette wheel and reflect the received light onto the electronic image detector, wherein the electronic image detector is configured to form an image of the ball play volume from the reflected light; and an image processor is configured to generate video image data from the formed image, and wherein the image processor is further configured to sample different data portions of the generated video image data, each sampled data portion corresponding to a respective image portion of the formed image, and each image portion being associated with a corresponding region of the ball play volume;

wherein the image processor is further configured to determine an angular velocity or a deceleration of a ball within the ball play volume by comparing a first data portion of the video image data sampled at different times, the first data portion corresponding to a respective first image portion associated with a corresponding region of the ball play volume in which the ball track of the roulette wheel is located.

2. The optical system of claim 1, wherein the image processor is further configured to determine a no more bets point by determining when a speed of the ball drops below a predetermined threshold.

3. The optical system of claim 1, wherein the image processor is further configured to determine a drop zone of the ball by determining an angular position of the ball with respect to the cylinder of the roulette wheel, when during its deceleration the ball leaves the ball track of the roulette wheel.

4. An optical system for monitoring a ball play volume of a roulette wheel, comprising:

an electronic image detector;

a convex reflector arranged to receive light from a ball play volume of a roulette wheel and reflect the received light onto the electronic image detector, wherein the electronic image detector is configured to form an image of the ball play volume from the reflected light; and an image processor is configured to generate video image data from the formed image, and wherein the image processor is further configured to sample different data portions of the generated video image data, each sampled data portion corresponding to a respective image portion of the formed image, and each image portion being associated with a corresponding region of the ball play volume;

wherein the image processor is further configured to determine an angular velocity or a deceleration of the cylinder of the roulette wheel by comparing a second data portion of the video image data sampled at different times, the second data portion corresponding to a respective second image portion associated with a corresponding region of the ball play volume in which at least a portion of the number ring of the roulette wheel or at least a portion the ball pockets of the roulette wheel are located.

5. An optical system for monitoring a ball play volume of a roulette wheel, comprising:

an electronic image detector;

a convex reflector arranged to receive light from a ball play volume of a roulette wheel and reflect the received light onto the electronic image detector, wherein the electronic image detector is configured to form an image of the ball play volume from the reflected light; and an image processor is configured to generate video image data from the formed image, and wherein the image processor is further configured to sample different data portions of the generated video image data, each sampled data portion corresponding to a respective image portion of the formed image, and each image portion being associated with a corresponding region of the ball play volume;

wherein the image processor is further configured to determine a ball pocket of the roulette wheel in which a ball is resting by comparing a third data portion of the video image data sampled at different times, the third data portion corresponding to a respective third image portion associated with a corresponding region of the ball play volume in which the ball pockets of the roulette wheel are located.

6. An optical system for monitoring a ball play volume of a roulette wheel, comprising:

an electronic image detector;

a convex reflector arranged to receive light from a ball play volume of a roulette wheel and reflect the received light onto the electronic image detector, wherein the electronic image detector is configured to form an image of the ball play volume from the reflected light; and an image processor is configured to generate video image data from the formed image, and wherein the image processor is further configured to sample different data portions of the generated video image data, each sampled data portion corresponding to a respective image portion of the formed image, and each image portion being associated with a corresponding region of the ball play volume;

wherein the image processor is further configured to determine when an object enters or leaves the ball play volume by comparing data portions of the video image data sampled at different times.

7. The optical system of any of claim 1, 4, 5, or 6, wherein the reflector is a mirror, and the mirror is aspherical.

8. The optical system of claim 1, 4, 5, or 6, wherein the image processor is implemented in software.

9. A method of monitoring a ball play volume of a roulette wheel, comprising the steps of:

using a convex reflector to receive light from the ball play volume and reflect the received light on to an electronic image detector;

forming an image of the ball play volume from the reflected light at the electronic image detector using an image processor to generate video image data from the formed image;

sampling different data portions of the generated video image data, each sampled data portion corresponding to a respective image portion of the formed image, and each image portion being associated with a corresponding region of the ball play volume; and comparing a first data portion of the video image data sampled at different times, the first data portion corresponding to a respective first image portion associated with a corresponding region of the ball play volume in which the ball track of the roulette wheel is located, so as to determine an angular velocity or a deceleration of a ball within the ball play volume.

10. The method of claim 9, further comprising the step of determining when a speed of the ball drops below a predetermined threshold so as to determine a no more bets point.

11. The method of claim 9, further comprising the step of determining a drop zone by determining an angular position of the ball with respect to the rotational axis of the roulette wheel, wherein the angular position is the angular position of the ball at the point where the ball, during its deceleration, leaves the ball track of the roulette wheel.

* * * * *